US011493973B2

(12) United States Patent
Suzuki

(10) Patent No.: US 11,493,973 B2
(45) Date of Patent: Nov. 8, 2022

(54) ELECTRONIC DEVICE AND METHOD FOR CONTROLLING THE SAME

(71) Applicant: CANON KABUSHIKI KAISHA, Tokyo (JP)

(72) Inventor: Yoshihisa Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/158,952

(22) Filed: Jan. 26, 2021

(65) Prior Publication Data

US 2021/0240242 A1 Aug. 5, 2021

(30) Foreign Application Priority Data

Jan. 31, 2020 (JP) .............................. JP2020-015890

(51) Int. Cl.
*G06F 1/26* (2006.01)
*H04N 1/00* (2006.01)
(Continued)

(52) U.S. Cl.
CPC .............. *G06F 1/266* (2013.01); *G06F 1/263* (2013.01); *G06F 13/385* (2013.01);
(Continued)

(58) Field of Classification Search
CPC .... G06F 1/266; G06F 11/3051; G06F 13/385; G06F 13/4004; G06F 13/4027;
(Continued)

(56) References Cited

U.S. PATENT DOCUMENTS

2017/0046289 A1* 2/2017 Hundal ............... G06F 13/4282
2017/0185126 A1* 6/2017 Trethewey ............. H02J 50/80
(Continued)

FOREIGN PATENT DOCUMENTS

JP 2018-13932 A 1/2018

OTHER PUBLICATIONS

Leung, Benson. "USB Type-C™'s Configuration Channel". Medium. Online Nov. 19, 2018. Retrieved from Internet Dec. 16, 2021. <https://medium.com/@leung.benson/usb-type-c-s-configuration-channel-31e08047677d>. (Year: 2018).*
(Continued)

*Primary Examiner* — Thomas J. Cleary
(74) *Attorney, Agent, or Firm* — Canon U.S.A., Inc. I.P. Division

(57) ABSTRACT

An electronic device that is able to operate by receiving a power supply from a host device through a Universal Serial Bus (USB). The electronic device acts as a first sink device and is connected to a second sink device that is able to operate by receiving a power supply from the host device through the USB and the connection to the first sink device. Each of the first sink device and the second sink device is provided with a CC terminal that obtains power supplying capability information from the host device, a pull-up or pull-down resistor connected to the CC terminal, and a GND terminal that grounds a circuit of the CC terminal and the pull-up or pull-down resistor. The electronic device changes a state of grounding of the pull-up or pull-down resistor to the GND terminal, in one of the first sink device and the second sink device.

15 Claims, 8 Drawing Sheets

(51) Int. Cl.
 *G06F 13/38* (2006.01)
 *G06F 13/40* (2006.01)

(52) U.S. Cl.
 CPC ..... *G06F 13/4068* (2013.01); *H04N 1/00891* (2013.01); *H04N 1/00901* (2013.01); *H04N 1/00907* (2013.01); *G06F 2213/0042* (2013.01)

(58) Field of Classification Search
 CPC ............ G06F 13/4045; G06F 13/4063; G06F 13/4068; G06F 13/4282; G06F 1/188; G06F 1/263; G06F 1/28; G06F 1/30; G06F 2213/0042; H04N 1/00891; H04N 1/00901; H04N 1/00907
 See application file for complete search history.

(56) References Cited

U.S. PATENT DOCUMENTS

| | | | | |
|---|---|---|---|---|
| 2018/0335819 A1* | 11/2018 | Waters | ........................ | G06F 1/28 |
| 2019/0207379 A1* | 7/2019 | Moritomo | ............ | G06F 13/4295 |
| 2020/0241615 A1* | 7/2020 | Tanase | ..................... | G06F 1/266 |
| 2021/0109580 A1* | 4/2021 | Tseng | ....................... | G06F 1/266 |

OTHER PUBLICATIONS

"Universal Serial Bus Power Delivery Specification". Revision 3.0. Version 1.1. Jan. 12, 2017. Apple Inc. et al. (Year: 2017).*

* cited by examiner

| SOURCE DEVICE | SINK DEVICE | SUPPLIED POWER | SUPPLIED POWER |
|---|---|---|---|
| PULL-UP RESISTOR | PULL-DOWN RESISTOR | (SPECIFICATION VALUE) | (EMBODIMENT VALUE) |
| 56k | 5.1k | 500mA/5V | 500mA/5V |
| 22k | 5.1k | 1.5A/5V | 1.5A/5V |
| 10k | 5.1k | 3.0A/5V | 1.5A/5V |

FIG.5

ELECTRONIC DEVICE AND METHOD FOR CONTROLLING THE SAME

BACKGROUND

Field

The present disclosure relates to an electronic device and a method for controlling the same.

Description of the Related Art

Devices that support Universal Serial Bus (USB) charging, which charges a battery (an auxiliary power source) using a USB, have been increasing in number in recent years. Generally, in the event of a USB power supply, a power-receiving device supplied with power (which may be hereinafter referred to as a sink device) conforms to standards such as USB 2.0, USB 3.0, USB Battery Charging (USB-BC), USB Power Delivery (USB-PD), as well as standards of a USB Type-C cable and its connector. In a case of such a Type-C device, the Configuration Channel (CC) terminal of a sink device is pulled up or down by a predetermined resistance value, and the sink device can detect the power supplying capability of a power-supplying device (which may be hereinafter referred to as a host device) by learning the voltage state at the CC terminal.

However, in a configuration where a plurality of sink devices can be connected to a host device, the pull-down resistors of the CC terminals of the respective sink devices can be connected in parallel, and the voltage can therefore be divided among the CC terminals. As a result, in some circumstances, erroneous detection of power supplying capability may occur where the detection of power supplying capability is based on identification of a voltage value at the CC terminal. This can pose problems such as stopping a power supply for USB charging.

Japanese Patent Laid-Open No. 2018-13932 describes a technique of determining whether a host device is Type-C, with the pull down of the CC terminal of a sink device being disconnected from ground (GND). This technique can ensure that a sink device determines whether the interface of the host device is Type-C or non-Type-C and determines the power supplying capability of the host device by using a method suitable for the type thus determined.

A power-receiving device to connect to a host device may have a removable battery. Then, data communications between the host device and the main body of the power-receiving device and charging of the removable battery may be performed through USB. In such a mode, there are demands for accurately detecting a USB connection by accurately measuring the voltage of the terminal used for the USB connection.

SUMMARY

Various embodiments of the present disclosure provide an electronic device and a method for controlling the same, which are capable of accurately detecting a USB connection.

In various embodiments, an electronic device that is able to operate by receiving a power supply from a host device through a USB is provided, the electronic device including an interface that connects the electronic device to a second sink device which is able to operate by receiving a power supply from the host device through the USB and the connection to the first sink device. Each of the first sink device and the second sink device include a CC terminal to obtain power supplying capability information from the host device, a pull-up or pull-down resistor connected to the CC terminal, and a GND terminal that grounds a circuit of the CC terminal and the pull-up or pull-down resistor. The electronic device also includes a control unit that changes a state of grounding of the pull-up or pull-down resistor to the GND terminal, in one of the first sink device and the second sink device.

According to various embodiments of the present disclosure, a USB connection can be accurately detected.

Further features will become apparent from the following description of exemplary embodiments with reference to the attached drawings.

BRIEF DESCRIPTION OF THE DRAWINGS

FIG. 5 is a diagram showing the relation between a specification value of supplied power and an embodiment value of supplied power which correspond to a pull-down resistor value (voltage value) of a battery pack, according to an embodiment of the present disclosure.

DESCRIPTION OF THE EMBODIMENTS

A detailed description is given of an electronic device according to an embodiment of the present disclosure. As an example of the electronic device, the present embodiment describes an inkjet printing apparatus that performs recording operations by ejecting ink. However, the electronic device is not limited to the above-described form, and may be any apparatus that can be supplied with power through a USB cable. Specifically, for example, the electronic device may be a printing apparatus that performs recording operations using a method other than the inkjet method. The electronic device may also be an apparatus other than a printing apparatus (such as a personal computer, a smartphone, a scanner, a digital camera, or a smart speaker). Further, the following embodiment is not intended to limit the present disclosure defined by the scope of claims, and not all the features and their combinations described in the present embodiment are necessarily essential to the solving means of the present disclosure.

Figure 1:
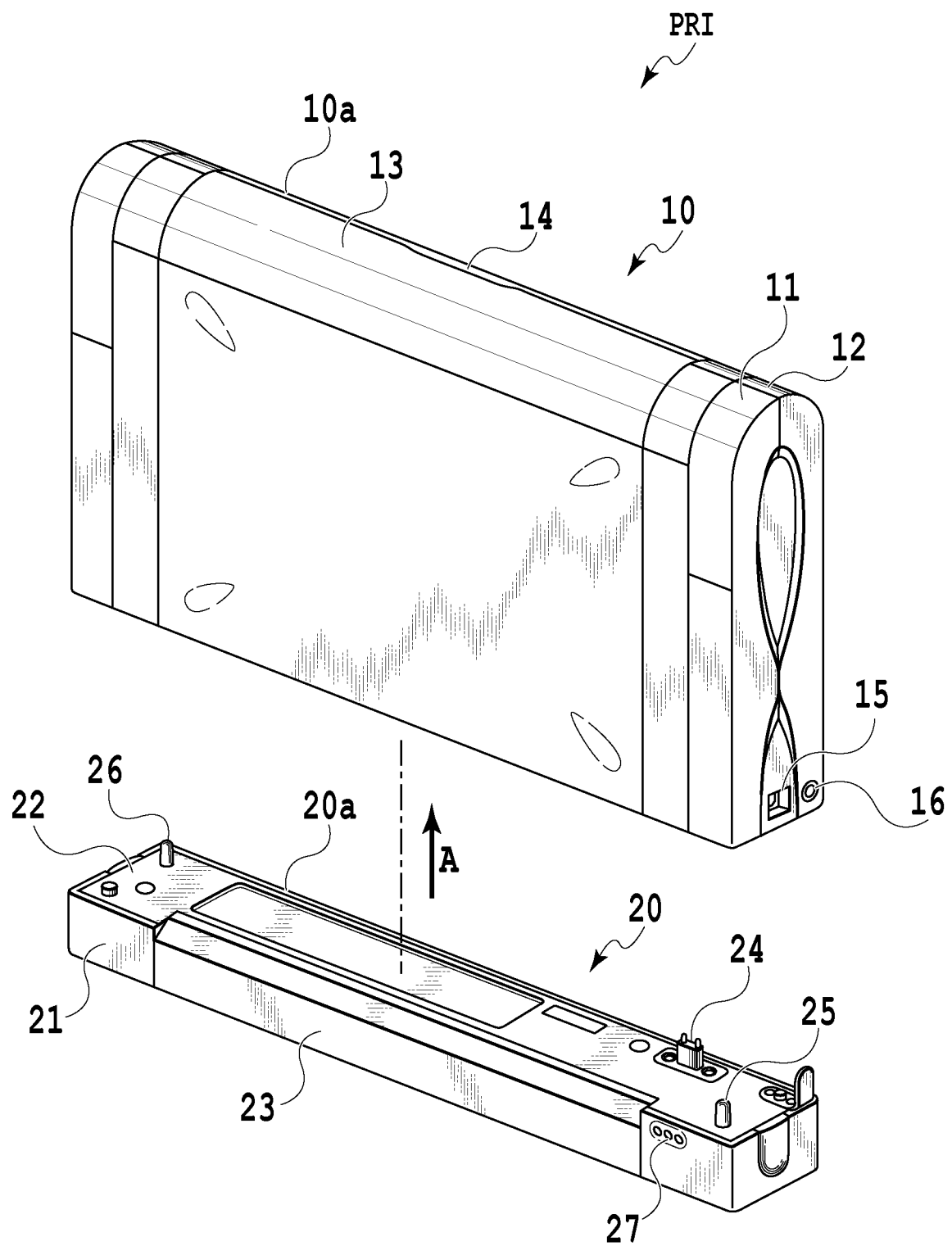
FIG. 1 is a perspective view of the outer appearance of an electronic device according to an embodiment of the present disclosure.

FIG. 1 is a perspective view of the outer appearance of an inkjet printing apparatus PRI. The printing apparatus PRI has a printing apparatus main body 10 and a battery module 20 that is attachable to and detachable from the printing apparatus main body 10.

The printing apparatus main body 10 has a casing unit 10a which forms the outer shell of the printing apparatus main body 10 and which is formed by an upper case 11, a lower case 12, a paper feed cover 13, and a paper discharge cover 14. The casing unit 10a houses a drive mechanism (FIG. 2) to be described later. FIG. 1 shows the printing apparatus PRI not in use (such as being placed on a desk or being carried). While the printing apparatus PRI is in use, the paper feed cover 13 is opened to the back and serves as a feed tray for placing a recording sheet.

The printing apparatus main body 10 is provided with, on its side surface, an interface (I/F) connector 15 and a direct-current input jack (DC-in jack) 16. The interface (I/F) connector 15 is where a USB cable is to be connected. The direct-current input jack (DC-in jack) 16 is where an AC adapter cable (not shown) used to receive a power supply from an AC power source is to be inserted.

The battery module 20 has a casing unit 20a which forms the outer shell of the battery module 20 and which is formed by a main case 21, a cover case 22, and a battery lid 23. The casing unit 20a houses a battery pack 54 ((FIG. 3) incorporating a lithium-ion battery. Removing the battery lid 23 and thereby opening the main case 21 allows the battery pack 54 to be taken out from the casing unit 20a. The battery module 20 is also provided with, on its surface to be attached to the printing apparatus main body 10 (a connection surface), a main body connector 24 for electrically connecting the battery module 20 to the printing apparatus main body 10 and fixation screws 25, 26 for mechanically fixing the battery module 20 to the printing apparatus main body 10.

Attaching the battery module 20 to the printing apparatus main body 10 in a direction denoted by arrow A in FIG. 1 causes the main body connector 24 to be electrically connected to the printing apparatus main body 10. Connecting an AC adapter 53 to the DC-in jack 16 in this state enables AC charging, where the battery pack 54 is charged with the AC adapter 53 serving as a power source. The AC adapter 53 (FIG. 3) is an apparatus that converts alternate-current power supplied from a commercial power source outside the printing apparatus main body 10 into direct-current power, and supplies the thus-converted direct-current power to the printing apparatus main body 10. In a state where the AC adapter 53 is connected to the printing apparatus main body 10 via connectors such as an outlet and a plug, power is supplied from the AC adapter 53 to the printing apparatus main body 10. While the AC adapter 53 is connected to the printing apparatus main body 10, the printing apparatus main body 10 is driven not by the power supplied from the battery pack 54, but by the power supplied from the AC adapter 53. While the AC adapter 53 is connected to the printing apparatus main body 10 with the printing apparatus main body 10 being in a hard-off state, the battery pack 54 is charged by the power supplied from the AC adapter 53. In the present embodiment, the AC adapter 53 is connected to the printing apparatus main body 10 through an interface other than USB. Thus, the printing apparatus main body 10 can be supplied with sufficiently large power from the AC adapter 53 without executing enumeration processing based on the USB standard.

In the present embodiment, connecting a power supply apparatus and the I/F connector 15 via a USB cable enables USB charging, where the battery pack 54 is charged by the power supply apparatus via a USB bus. After the battery pack 54 is charged up, the printing apparatus PRI can be operated by the power supplied from the battery even without a power supply from the outside. The top surface of the battery module 20 is provided with a charge display unit 27 to indicate the charging status of the battery. The power supply apparatus is, for example, an apparatus serving as an external power source, and may be a host personal computer (PC) or a mobile battery. In a case where a host PC and the printing apparatus main body 10 are connected to each other via a USB cable, enumeration processing based on the USB standard may be executed. The enumeration processing is a series of data communications performed in order for the operating system (OS) of the host PC to recognize the apparatus USB-connected thereto (the printing apparatus main body 10 here). Once the enumeration processing is completed, the OS of the host PC can recognize various pieces of information in the apparatus USB-connected thereto. In a case where the host PC and the printing apparatus main body 10 are connected via a USB cable, not only charging via the USB cable, but also data communications (such as print data communications) via the USB cable are possible between the host PC and the printing apparatus main body 10. In other words, in the present embodiment, in a state where the printing apparatus main body 10 is in a soft-on state, the printing apparatus main body 10 can receive print data from the host PC via a USB cable and execute printing based on the received print data.

Figure 2:
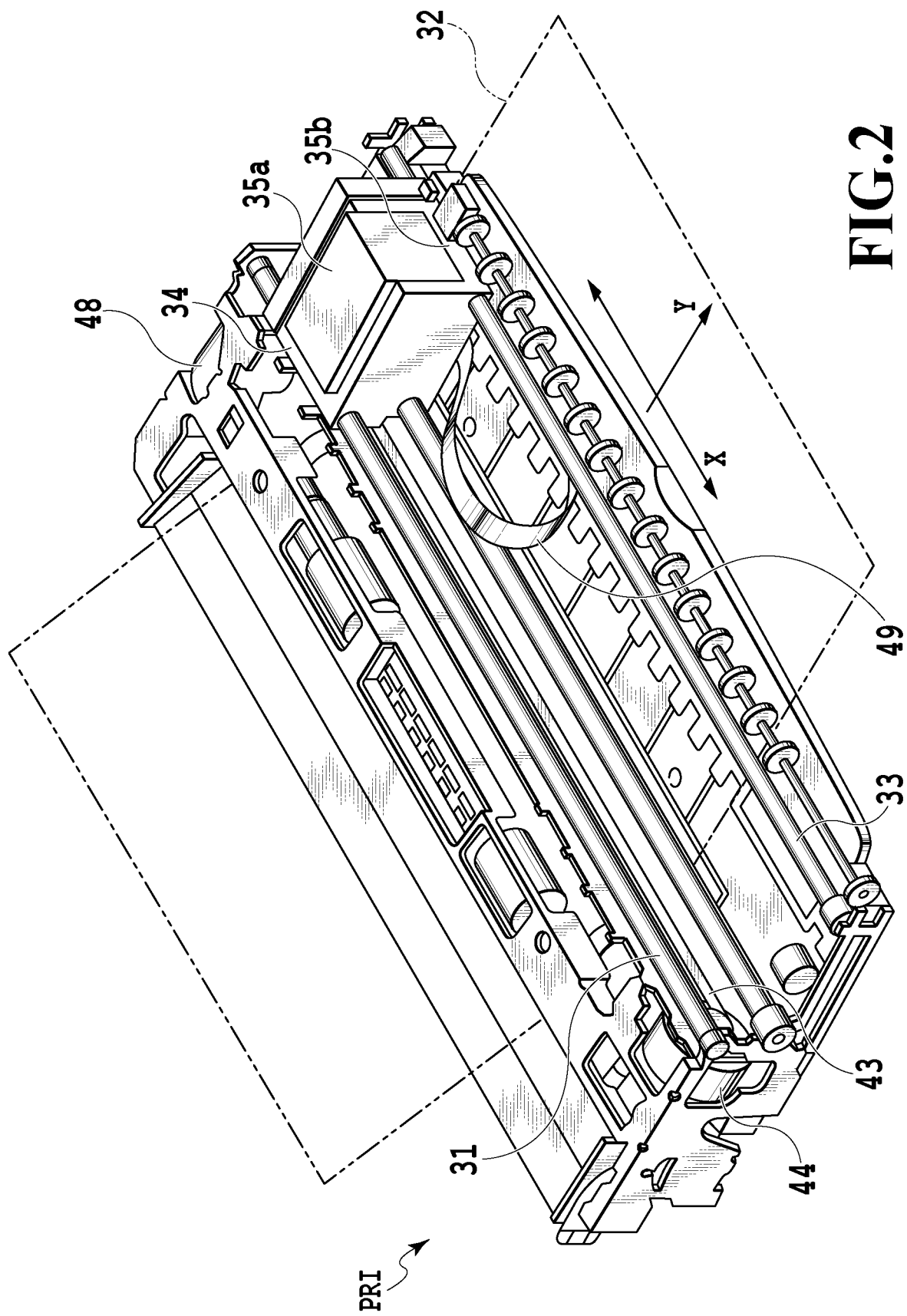
FIG. 2 is a perspective view illustrating the internal structure of the electronic device shown in FIG. 1.

FIG. 2 is a perspective view showing the drive mechanism 40 of the printing apparatus PRI. The printing apparatus PRI has a conveyance roller 31, a guide rail 33, a carriage 34, an ink tank 35a, a recording head 35b, a carriage belt 43, a carriage motor 44, a conveyance motor 48, and a flexible cable 49. The recording head 35b is mounted on the carriage 34 and is capable of moving back and forth along the guide rail 33 in a main scanning direction (X direction). The recording head 35b is supplied with ejection data via the flexible cable 49, the ejection data being generated based on input image data and indicating ejection or non-ejection of ink. The recording head 35b ejects ink based on this ejection data. Ejected ink lands on a recording medium 32 supported with a minute space from the recording head 35b, thereby recording (printing) an image on the recording medium 32.

The carriage motor 44 is a motor for causing the carriage 34 to scan along the guide rail 33. The drive force of the carriage motor 44 is transmitted to the carriage 34 via the carriage belt 43. The conveyance motor 48 is a motor for rotating the conveyance roller 31 to convey the recording medium 32 in a direction (Y direction) intersecting with the main scanning direction. This conveyance motor 48 and the conveyance roller 31 constitute conveyance means that conveys a recording medium. The printing apparatus of the present embodiment is thus a serial-type printing apparatus which performs recording by moving the ink-ejecting recording head 35b back and forth in the main scanning direction, while intermittently conveying a recording medium in the Y direction.

In the present embodiment, the recording head 35b is coupled with the ink tank 35a, together forming a head cartridge. This head cartridge may be configured so that the recording head 35b and the ink tank 35a are separable or integral.

Figure 3:
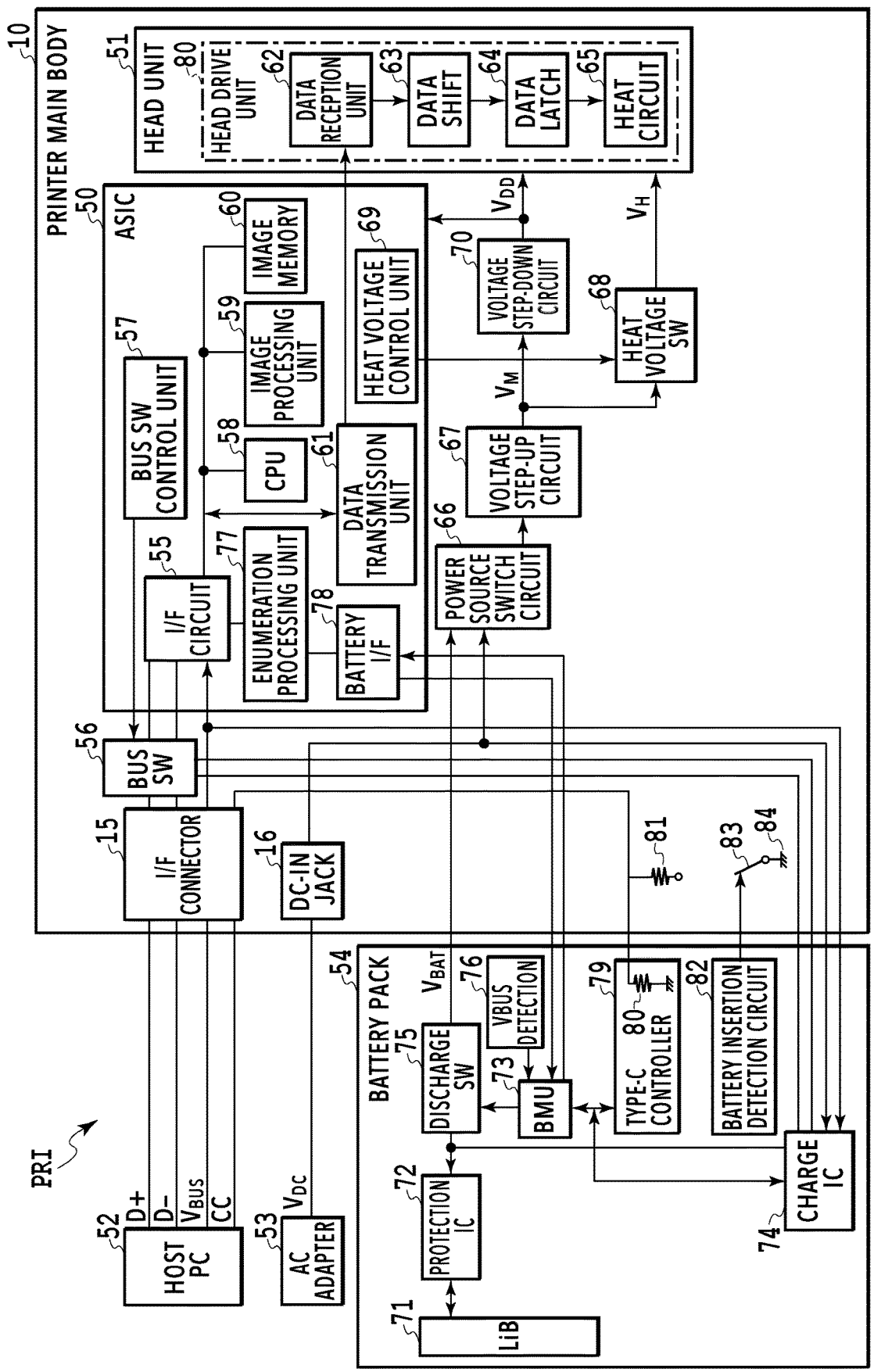
FIG. 3 is a block diagram showing the control configuration of the electronic device shown in FIG. 1.

FIG. 3 is a block diagram showing the control configuration of the printing apparatus PRI. The printing apparatus main body 10 is provided with an application-specific integrated circuit (ASIC) 50 that controls the printing apparatus PRI, a head unit 51, a power source switch circuit 66, a voltage step-up circuit 67, a heat voltage switch (SW) 68, a voltage step-down circuit 70, and a bus SW 56. In the present embodiment, the ASIC 50 (or a central processing unit (CPU) 58 incorporated in the ASIC 50) is the controller that executes enumeration processing. The printing apparatus main body 10 is also provided with the I/F connector 15 and the DC-in jack 16 described earlier. The I/F connector 15 allows the printing apparatus main body 10 to be connected to a power supply apparatus (a host PC 52 in this example), and the DC-in jack 16 allows the printing apparatus main body 10 to be connected to the AC adapter 53.

The host PC 52 transmits image data on an image to be recorded by the printing apparatus main body 10 and various control commands to the printing apparatus main body 10 via a USB cable. Control commands and recording data transmitted from the host PC 52 are received by an interface (I/F) circuit 55 provided to the ASIC 50, via the I/F connector 15 and the bus SW 56. The bus SW 56 is controlled by a bus SW control unit 57, and is capable of selectively connecting the D+ and D− pins of the host PC 52 to either one of the ASIC 50 and the battery pack 54.

A control command received by the interface (I/F) circuit 55 is analyzed by the CPU 58, and the printing apparatus PRI is controlled according to the control command. Recording data received by the interface (I/F) circuit 55 is sent to an image processing unit 59. The image processing unit 59 performs image processing according to a recording method to be executed from among various recording methods, and data obtained by the image processing is stored in an image memory 60 as ejection data indicating ejection and non-ejection of ink. The stored ejection data is read from the image memory 60 at the time of recording.

A data transmission unit 61 provided to the ASIC 50 transmits recording data read from the image memory 60 to the head unit 51. The ASIC 50 is equipped with an enumeration processing unit 77 to perform enumeration processing between the host PC 52 and the printing apparatus main body 10 in the event where the host PC 52 is connected to the printing apparatus main body 10. A result of the processing performed by the enumeration processing unit 77 is communicated via a battery interface (I/F) 78 to a battery management unit (BMU) 73 to be described later provided to the battery pack 54. A heat voltage control unit 69 incorporated in the ASIC 50 outputs an instruction controlling ON and OFF of the heat voltage SW 68. In the present embodiment, the CPU 58 that controls the ASIC 50 is included in the ASIC 50. Thus, in the following description of the present embodiment, processing executed by the ASIC 50 is executed by the CPU 58 controlling the ASIC 50.

The head unit 51 is formed by the recording head 35b and the ink tank 35a described earlier, and a head drive unit 80 that drives the recording head 35b. After a data reception unit 62 receives ejection data transmitted from the data transmission unit 61, the head drive unit 80 inputs the ejection data to a shift register 63. The shift register 63 outputs the ejection data to a data latch 64 as serial data. The data latch 64 temporarily stores the ejection data outputted from the shift register 63, then converts the ejection data to parallel data, and outputs the parallel data to a heat circuit 65. The heat circuit 65 receives ejection data outputted from the data latch 64 and heat pulse width information corresponding to a period of time for heating the ejection energy producing elements (heaters) of the recording head, selectively drives the ejection energy producing elements based on the information received, and thereby causes ink to be ejected.

The printing apparatus main body 10 is capable of being driven by an output voltage $V_{DC}$ from the AC adapter 53 and being driven by an output voltage $V_{BAT}$ from the battery pack 54. The output voltage $V_{DC}$ and the output voltage $V_{BAT}$ used for driving the printing apparatus main body 10 are selectively switched by the power source switch circuit 66. In the present embodiment, in a case where both of the AC adapter 53 and the battery pack 54 are connected to the printing apparatus main body 10, the power source switch circuit 66 is controlled so that the printing apparatus may be driven by the output voltage $V_{DC}$ from the AC adapter 53. A voltage outputted from the power source switch circuit 66 is stepped up by the voltage step-up circuit 67 to a voltage (heat voltage $V_H$) used to heat the heaters (ejection energy producing elements) of the recording head. The heat voltage SW 68 carries or cuts (switches ON/OFF) a supply of the heat voltage $V_H$ to the heat circuit 65. This ON/OFF control of the heat voltage SW 68 is performed as instructed by the heat voltage control unit 69 incorporated in the ASIC 50. The voltage step-down circuit 70 steps down a voltage VM outputted from the voltage step-up circuit 67 and generates a logic power source voltage $V_{DD}$ to be used in the ASIC 50 or the head unit 51.

The battery pack 54 has a chargeable lithium-ion battery (LiB) 71 which serves as a power source, a protection IC 72, the BMU 73, a charge IC 74, a discharge SW 75, and a VBUS detection circuit 76. The protection IC 72 is an IC with a function of protecting the LiB 71 from abnormal operations such as overdischarge, overcharge, and overcurrent, and is a processor incorporated in the battery pack 54. The BMU 73 is a unit for controlling mainly discharging and charging of the LiB 71. The BMU 73 communicates with the ASIC 50 via a battery I/F 78 incorporated in the ASIC 50, and controls discharging and charging of the LiB 71 as commanded by the ASIC 50. In the present embodiment, communications between the BMU 73 and the ASIC 50 are carried out using the universal asynchronous receiver-transmitter (UART) scheme.

As instructed by the BMU 73, the charge IC 74 performs control such as control of a charge current for the LiB 71 and control of ON/OFF of charging, and is capable of charging the LiB 71 using both the voltage $V_{DC}$ from the AC adapter 53 and a voltage VBUS from the power supply apparatus through USB as a power source. The charge IC 74 is connected to the D+ and D− pins via the bus SW 56, and in the event of USB charging, determines a charge current suitable for the power-supplying host PC 52 or the USB device.

In USB charging with the charging configuration described above, the host PC 52 is a host device, and the printing apparatus main body 10 and the battery pack 54 are sink devices. In this configuration, the I/F connector 15 in the printing apparatus main body 10 is provided with CC, GND, VBUS, D−, and D+ terminals for connecting a USB cable. Further, a switch 83 is provided between the I/F connector 15 in the printing apparatus main body 10 and the battery pack 54 to switch the status between the CC terminal and the GND terminal between "connected (grounded)" and "not connected (not grounded)".

A Type-C controller 79 in the battery pack 54 includes the above-described CC terminal and a pull-down resistor 80 one end of which is connected to this terminal and the other end of which is connected to GND. This makes the controller circuit have a pulled-down configuration. In a case where the host device to which the printing apparatus main body 10 is connected is a Type-C device, the Type-C controller 79 can obtain power supplying capability information regarding the host device by identifying the voltage status of the CC terminal. A Type-C device has two CC terminals to be able to identify the front and back sides of a cable connected thereto, and an effective CC terminal is determined by the orientation of the connected cable. In the present embodiment, the battery pack is removable; thus, the printer too is provided with a pull-down resistor 81 so that a USB connection can be detected even in a case where the battery pack 54 is not inserted (or is removed). The battery pack 54 includes an insertion detection unit (battery insertion detection circuit) 82 which allows the printing apparatus main body 10 to recognize insertion of the battery pack. Specifically, a signal from the insertion detection unit 82 not only enables the ASIC 50 in the printing apparatus main body 10 to detect whether the battery pack 54 is inserted or removed, but also changes the state of the switch 83 indicating the connection state between a GND unit 84 and the pull-down resistor 81 in the printing apparatus main body 10.

In the present embodiment, as will be described later using FIG. 4 and the like, the pull-down resistor for the CC terminal in the printing apparatus main body 10 is disabled in a case where the printing apparatus main body 10 as a sink device is connected to the host PC 52 with the battery pack 54 as a sink device connected thereto. Disabling the pull-down resistor in the printing apparatus main body 10 means, specifically, changing the grounding state of the pull-down resistor in the printing apparatus main body 10. To be more specific, a current flowing through the CC terminal is kept from flowing to the pull-down resistor in the printing apparatus main body 10, and is caused to flow only to the pull-down resistor in the battery pack 54. By contrast, the pull-down resistor for the CC terminal in the printing apparatus main body 10 is enabled in a case where the printing apparatus main body 10 as a sink device is connected to the host PC 52 with the battery pack 54 as a sink device not connected thereto. Enabling the pull-down resistor in the printing apparatus main body 10 means, specifically, causing a current flowing through the CC terminal to flow to the pull-down resistor in the printing apparatus main body 10.

As described above, in a state where a plurality of sink devices (the printing apparatus main body 10 and the battery pack 54) are connected to the host PC which is a host device, the pull-down resistors for the CC terminals of the respective sink devices are connected in parallel, and voltage is therefore divided between the CC terminals. As a result, erroneous detection may occur in the identification of voltage values on the CC terminals, which can cause errors such as stopping USB power supply.

This problem can be basically solved by providing a pull-down resistor to a sink device directly connected to the host and not to any of the other sink devices. However, this measure is not necessarily optimal in a case where a sink device directly connected to the host device does not need current control whereas a removable sink device connected in parallel needs current control. The reason for this is as follows. There is a case where a Type-C controller that controls a current supply is equipped with a pull-down resistor for the CC terminal, and in a case where a removable sink device having a Type-C controller is connected, voltage division occurs due to combined resistance. Further, there are concerns that providing a Type-C controller to a sink device that does not need current control leads to unnecessarily high specification, an increase in costs, and an increase in the area of a substrate because of the additional component.

In the present embodiment, the configuration to be described later with reference to FIG. 4 and the like solves such derivative problems as well, and achieves accurate identification using a voltage value on a CC terminal.

Referring back to FIG. 3, the present embodiment performs a determination that conforms to the USB Battery Charging (USB-BC) specification (hereinafter referred to as a BCS determination).

There are three determination results: Standard Downstream Port (SDP), Charging Downstream Port (CDP), and Dedicated Charging Port (DCP). In the present embodiment, control is performed to permit charging with a current of 500 mA after completion of enumeration processing in a case of SDP and charging with a current of 1.5 A in a case of CDP or DCP.

The timing of the BCS determination can be controlled by the ASIC 50 via the battery I/F 78. A result of the BCS determination is transmitted to the ASIC 50 via the BMU 73 and the battery I/F 78. The discharge SW 75 is a switch to turn on and off the voltage from the LiB 71, and is controlled by the BMU 73. The VBUS detection circuit 76 is a circuit for detecting a connection of the host PC 52 or a USB device to the I/F connector 15 of the printing apparatus main body 10, and a result of the detection is transmitted to the BMU 73. The ASIC 50 is equipped with the enumeration processing unit 77 which, in the event where the host PC 52 is connected, performs enumeration processing between the printing apparatus main body 10 and the host PC 52. Information indicating completion of the enumeration processing is communicated to the BMU 73 via the battery I/F 78. In the present embodiment, the BMU 73 sets a charge current for the charge IC 74 based on information indicative of completion of enumeration processing and information indicative of a BCS determination result.

Figure 8A:
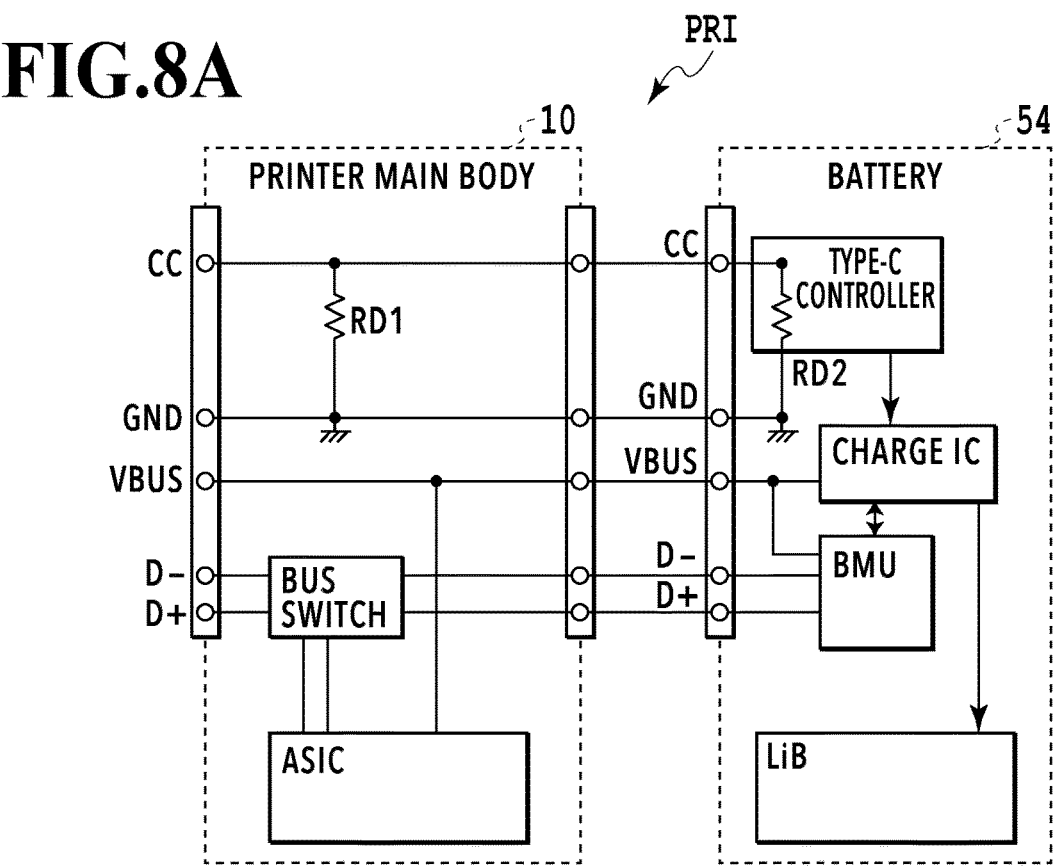
FIGS. 8A and 8B show an example circuit configuration of an apparatus capable of performing USB data communications and USB charging.
Figure 8B:
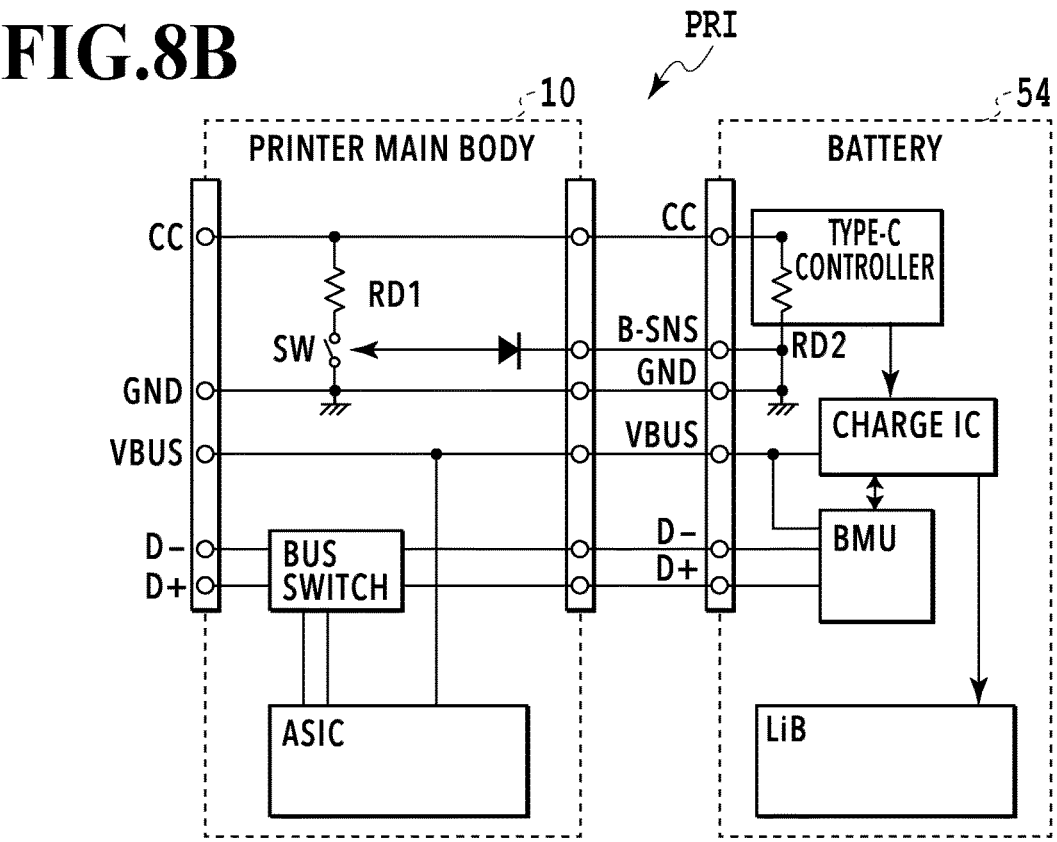

A detailed description is given of challenges to be overcome by the present disclosure. In the present embodiment, the printing apparatus PRI can charge the battery pack 54 and communicate print data via a USB connection. In a case where a USB connection is made with the battery pack 54 being attached to the printing apparatus main body 10, the printing apparatus PRI needs to detect the USB connection in order to charge the battery pack 54. As described above, the printing apparatus PRI also communicates print data via the USB connection. For this reason, even in a case where a USB connection is made with the battery pack 54 not being attached to the printing apparatus main body 10 and there is no need to charge the battery pack 54, the printing apparatus PRI or the host apparatus to which the printing apparatus PRI is USB-connected still needs to detect the USB connection to start data communications. For this detection, the printing apparatus PRI measures the voltage value across a pull-down resistor through which a current flowing to the printing apparatus PRI via the USB connection flows. In the present embodiment in which the battery pack 54 is removable, in a case where only the battery pack 54 has a pull-down resistor through which a current flowing to the printing apparatus PRI via the USB connection flows, if the battery pack 54 is removed, the printing apparatus PRI or the apparatus which is USB-connected to the printing apparatus PRI cannot detect the USB connection. Thus, in a mode where the battery pack 54 is removable, it is preferable that both the battery pack 54 and the printing apparatus main body 10 have a pull-down resistor through which a current flowing to the printing apparatus PRI via a USB connection flows. FIGS. 8A and 8B show examples where both the battery pack 54 and the printing apparatus main body 10 have a pull-down resistor through which a current flowing to the printing apparatus PRI via a USB connection flows.

In FIGS. 8A and 8B, there is a pull-down resistor RD1 in the printing apparatus main body 10 (the printing apparatus main body), and there is a pull-down resistor RD2 in the battery pack 54 (the battery). However, in the mode shown in FIG. 8A, in a mode where the battery pack 54 is attached to the printing apparatus main body 10, the voltages on the CC terminals are divided therebetween because the pull-down resistors are connected in parallel in a circuit through which a current flowing to the printing apparatus PRI via the USB connection flows. In other words, a voltage value corresponding to the power being supplied to the printing apparatus PRI via the USB connection cannot be accurately measured. Thus, the present embodiment has a configuration shown in FIG. 8B. Specifically, the printing apparatus main body 10 is provided with a switch SW which can control whether to pass a current to the pull-down resistor RD1. Then, in a mode where the battery pack 54 is attached to the printing apparatus main body 10, the switch SW is turned off so as not to pass a current to the pull-down resistor RD1. In a mode where the battery pack 54 is not attached to the printing apparatus main body 10, the switch SW is turned on so as to pass a current to the pull-down resistor RD1. Such a mode can help prevent the voltages on the CC terminals from being divided therebetween and measured.

Figure 4:
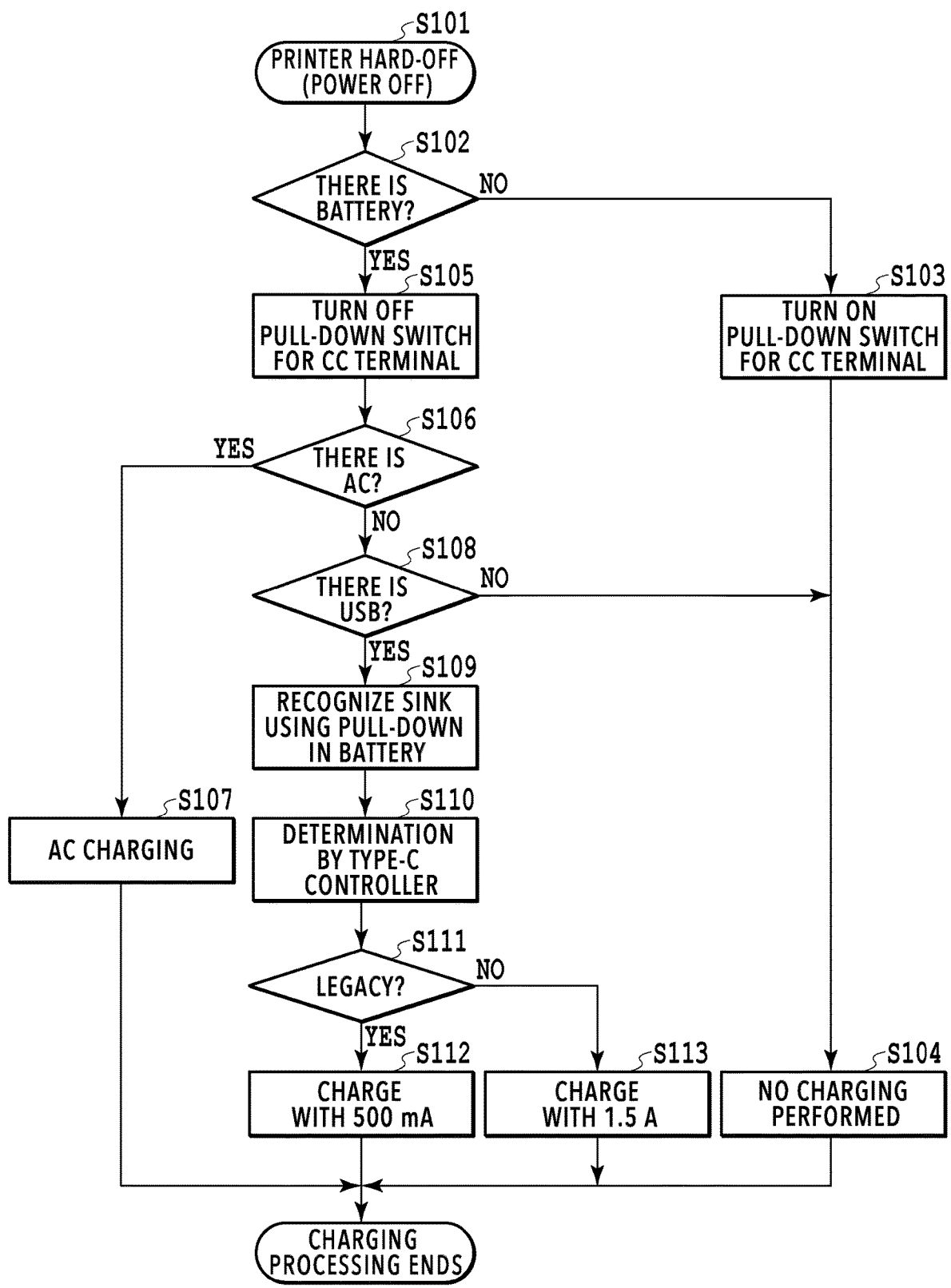
FIG. 4 is a flowchart showing USB charging processing according to an embodiment of the present disclosure, performed with a printer being in a hard-off state (power off).

FIG. 4 is a flowchart showing USB charging processing according to an embodiment of the present disclosure, performed with the printer being in a hard-off (power-off) state. This processing is executed by the ASIC (control unit) 50 in the printing apparatus main body 10.

First, it is determined whether the battery pack 54 (an auxiliary power source) is attached (inserted) (S102). As described above, this determination can be done by the ASIC 50 in the printing apparatus main body 10 detecting a signal from the insertion detection unit 82 in the battery pack 54. In a case where the battery pack 54 is not attached to the printing apparatus main body 10, the pull-down resistor RD1, which is a resistor connected to the CC terminal used for USB connection and located inside the printing apparatus main body 10, is enabled (the pull-down switch is turned on) (S103), no charging operation is performed (S104), and this processing ends.

In a case where the battery pack 54 is inserted, the pull-down resistor RD1 is disabled (the pull-down switch is turned off) (S105). This consequently enables the pull-down resistor RD2, which is a resistor connected to the CC terminal used for USB connection and provided in the Type-C controller 79 located in the battery.

Next, a determination is made as to whether the AC adapter 53 is connected (S106). As described above, in the present embodiment, in a case where the AC adapter 53 and the battery pack 54 are both inserted (YES in S106), a power supply transitions to AC charging (S107). In a case where the AC adapter 53 is not inserted, whether a USB device is connected is detected (S108). In a case where no USB device is connected, no charging is performed (S104), and this processing ends.

In a case where a USB device is connected, a voltage value on the CC terminal of the battery pack 54 which is provided in the Type-C controller 79 is read (S109). As described above, the pull-down resistor RD2 is enabled here since the pull-down resistor RD1 is disabled.

In this state, the Type-C controller 79 makes a legacy determination, reading a voltage value on the CC terminal pulled down (a voltage value in a circuit between the CC terminal and the pull-down resistor RD2) (S110). Then, according to the voltage value read, the Type-C controller 70 switches charging modes (S111) between 500 mA charging (S112) and 1.5 A charging (S113). FIG. 5 is a diagram showing the relation between a specification value of supplied power and an embodiment value of supplied power corresponding to a pull-down resistor value (voltage value) of a sink device (the battery pack 54). For the pull-down resistor value of the sink device, the specification values of supplied power are 500 mA, 1.5 A, and 3.0 A, while the embodiment value is 500 mA for the specification value of supplied power of 500 mA and is 1.5 A for each of the specification values of 1.5 A and 3.0 A.

According to the processing described above, in a state where a plurality of sink devices (the printing apparatus main body 10 and the battery pack 54) are connected to the host PC, the voltage value on the CC terminal can be detected with the pull-down resistor RD1 being disabled. This allows accurate detection of a voltage value on the CC terminal and prevents, for example, USB power supply from being stopped.

Figure 6:
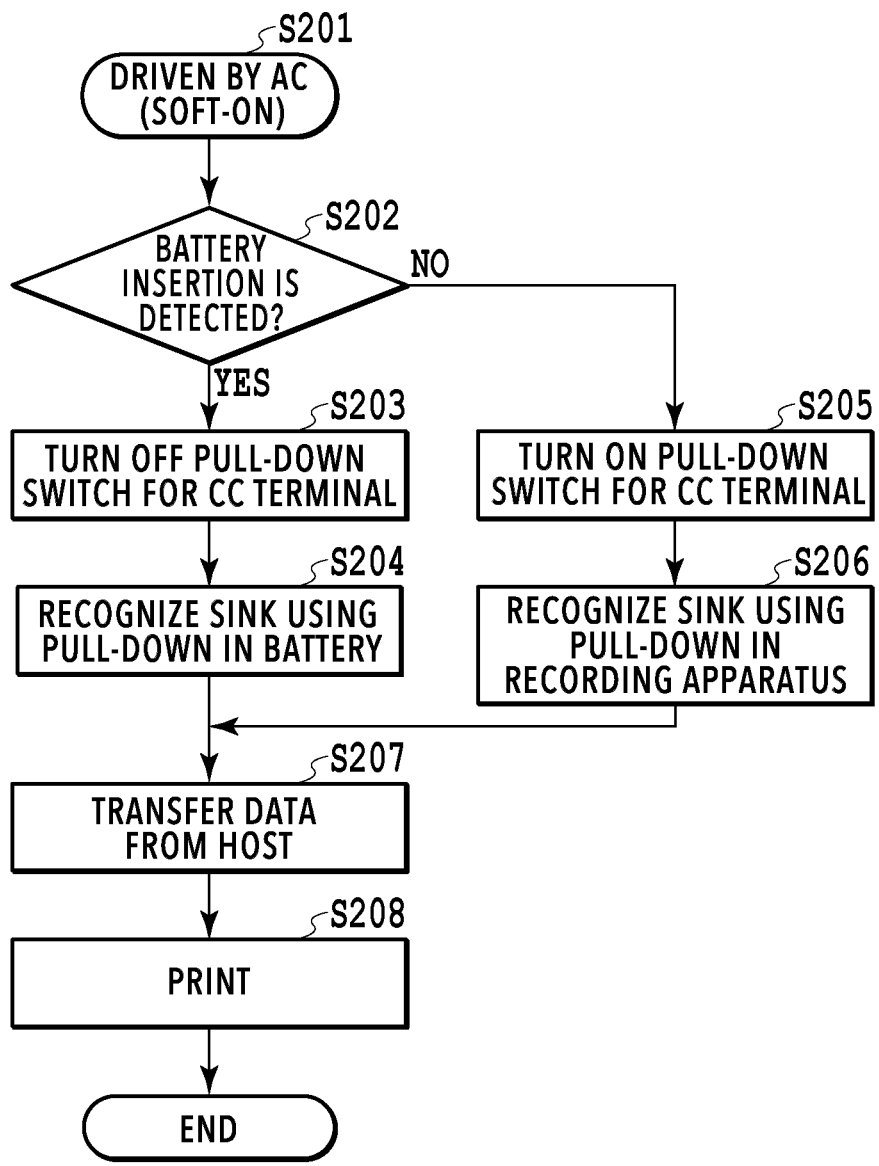
FIG. 6 is a flowchart showing USB printing processing according to an embodiment of the present disclosure, performed with the printer being driven by an AC adapter.

FIG. 6 is a flowchart showing USB printing processing according to an embodiment of the present disclosure, performed with the printer being driven by the AC adapter. This processing is executed by the ASIC 50 in the printing apparatus main body 10.

With the printer being driven by power supplied from the AC adapter 53 (soft-on state; S201), first, whether the battery pack 54 (an auxiliary power source) is inserted is detected (S202). In a case where an auxiliary power source is inserted (YES in S202), the pull-down resistor RD1 is disabled (S203). This consequently enables the pull-down resistor RD2, and the battery pack 54 is recognized as a sink device through this pull down (S204).

In a case where an auxiliary power source is not inserted (NO in S202), the pull down for the CC terminal of the printing apparatus main body 10 is turned on (S205), and the printing apparatus main body 10 is thereby recognized as a sink device through the pull down in the printer (S206).

After a normal voltage value is recognized by the pull down of the CC terminal of either the printer side or the auxiliary power source side, power is supplied by VBUS of the host PC 52 which is a host device, and the VBUS detection circuit detects a connection of the host PC or a USB device. Thereafter, print data is transmitted to the ASIC (S207), and the printer transitions to printing state (S208).

Figure 7:
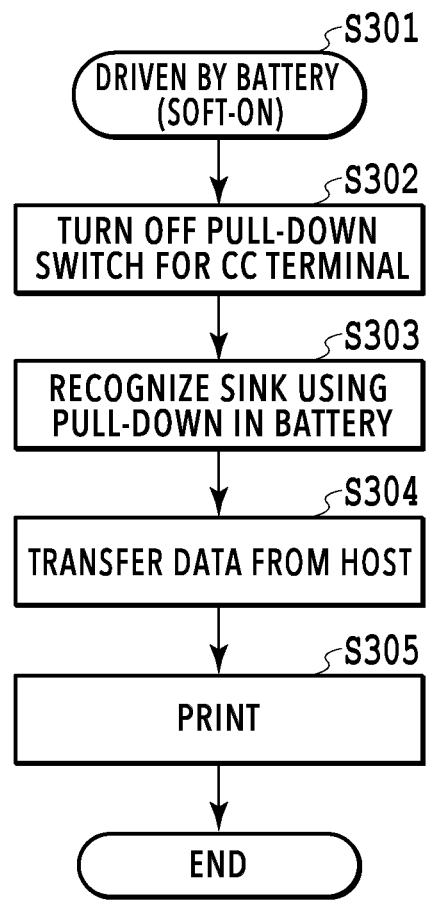
FIG. 7 is a flowchart of USB printing processing according to an embodiment of the present disclosure, performed with the printer being driven by a battery.

FIG. 7 is a flowchart of USB printing processing according to an embodiment of the present disclosure, performed with the printer being driven by the battery. This processing is executed by the ASIC 50 in the printing apparatus main body 10.

With the printer being driven by power supplied from the battery pack 54 (soft-on state) (S301), first, the pull-down resistor RD1 is disabled (S302). Consequently, the pull-down resistor RD2 is enabled, and the battery pack 54 is recognized as a sink device through this pull down in the battery (S303). After a normal voltage value on the CC terminal is thereby recognized, power is supplied by VBUS of the host device, and the VBUS detection circuit detects a connection of the host PC or a USB device. Thereafter, print data is transmitted to the ASIC 50 (S304), and the printer transitions to printing state (S305).

According to the embodiment of the present disclosure described above, for USB power supply in a configuration where a plurality of sink devices are connected to a host device, the pull down for a CC terminal of one of the sink devices is enabled, and the pull down for a CC terminal of the other sink device is disabled. This ensures that a proper voltage is detected on the CC terminal with the enabled pull down, and allows a charge current from the host device to be set to an appropriate value.

Although the embodiment described above detects a voltage on the CC terminal using a pull-down resistor, it goes without saying that the present disclosure is not limited to this embodiment. The present disclosure is also applicable to a configuration in which a pull-up resistor is used to detect a voltage on a CC terminal.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-015890 filed Jan. 31, 2020, which is hereby incorporated by reference herein in its entirety.

What is claimed is:

1. An electronic device that is able to operate by receiving a power supply from a host device through a Universal Serial Bus (USB), the electronic device acting as a first sink device and comprising:
   an interface that is able to connect the first sink device to a second sink device which is able to operate by receiving a power supply from the host device through the USB and the connection to the first sink device;
   a first Configuration Channel (CC) terminal that obtains power supplying capability information from the host device,
   a first pull-up or pull-down resistor connected to the first CC terminal,
   a first GND terminal that grounds a circuit of the first CC terminal and the first pull-up or pull-down resistor, and
   a switch configured to change a state of grounding of the first pull-up or pull-down resistor to the first GND terminal,
   wherein the second sink device includes a second CC terminal which connects to the first CC terminal in a case where the second sink device is inserted into the first sink device, a second pull-up or pull-down resistor connected to the second CC terminal and capable of connecting to the first pull-up or pull-down resistor electrically in parallel in a case where the second sink device is inserted into the first sink device, and a second GND terminal configured to ground a circuit of the second CC terminal and the second pull-up or pull-down resistor, and
   wherein in a case where the second sink device is inserted into the first sink device, the switch disables the grounding of the first pull-up or pull-down resistor to the first GND terminal and enables the grounding of the second pull-up or pull-down resistor to the second GND terminal.

2. The electronic device according to claim 1, wherein the second sink device is a chargeable auxiliary power source.

3. The electronic device according to claim 1, further comprising one or more processors serving as a control unit configured to detect whether the second sink device is inserted into or removed from the first sink device.

4. The electronic device according to claim 1, wherein not inserted into the first sink device, the switch enables the grounding of the first pull-up or pull-down resistor to the first GND terminal.

5. The electronic device according to claim 1, further comprising one or more processors serving as a print unit that executes printing.

6. The electronic device according to claim 5, further comprising a reception unit that receives print data from the host device through the USB, wherein
   the print unit executes printing based on the print data received by the reception unit.

7. The electronic device according to claim 1, wherein in a case where an AC power source and the second sink device are inserted into the first sink device and the first sink device is in a power-off state, the second sink device is charged with power supplied from the AC power source.

8. The electronic device according to claim 1, wherein in a case where an AC power source is not connected to the first sink device, the host device and the second sink device are inserted into the first sink device and the first sink device is in a power-off state, the second sink device is charged with power supplied from the host device.

9. A method for controlling an electronic device, the electronic device able to operate by receiving a power supply from a host device through a USB, the electronic device acting as a first sink device, and the method comprising:
   detecting whether a second sink device is inserted into the first sink device, the second sink device being able to operate by receiving a power supply from the host device through the USB and the connection to the first sink device,
   wherein the first sink device includes a first Configuration Channel (CC) terminal that obtains power supplying capability information from the host device, a first pull-up or pull-down resistor connected to the first CC terminal, and a first GND terminal that grounds a circuit of the first CC terminal and the first pull-up or pull-down resistor, and
   wherein the second sink device includes a second CC terminal which connects to the first CC terminal in a case where the second sink device is connected to the first sink device, a second pull-up or pull-down resistor connected to the second CC terminal and capable of connecting to the first pull-up or pull-down resistor electrically in parallel in a case where the second sink device is connected to the first sink device, and a second GND terminal configured to ground a circuit of the second CC terminal and the second pull-up or pull-down resistor; and disabling the grounding of the first pull-up or pull-down resistor to the first GND terminal and enabling the grounding of the second pull-up or pull-down resistor to the second GND terminal, in a case where an inserting of the second sink device is detected.

10. The method for controlling the electronic device according to claim 9, wherein
the second sink device is a chargeable auxiliary power source.

11. The method for controlling the electronic device according to claim 9, further comprising enabling the grounding of the first pull-up or pull-down resistor to the first GND terminal, in a case where the detecting detects that the second sink device is not inserted into the first sink device.

12. The method for controlling the electronic device according to claim 9, further comprising executing printing.

13. The method for controlling the electronic device according to claim 12, further comprising receiving print data from the host device through the USB, wherein
the executing printing executes printing based on the print data received in the receiving.

14. The method for controlling the electronic device according to claim 9, wherein in a case where an AC power source and the second sink device are inserted into the first sink device and the first sink device is in a power-off state, the second sink device is charged with power supplied from the AC power source.

15. The method for controlling the electronic device according to claim 9, wherein in a case where an AC power source is not connected to the first sink device, the host device and the second sink device are inserted into the first sink device and the first sink device is in a power-off state, the second sink device is charged with power supplied from the host device.

* * * * *